(12) United States Patent
Vena

(10) Patent No.: US 6,445,302 B2
(45) Date of Patent: Sep. 3, 2002

(54) PET WIRELESS DOORBELL DEVICE

(76) Inventor: Anthony Vena, 33 Picardy Pl., Southampton, NJ (US) 08088

( * ) Notice: Subject to any disclaimer, the term of this patent is extended or adjusted under 35 U.S.C. 154(b) by 0 days.

(21) Appl. No.: 09/833,283

(22) Filed: Apr. 12, 2001

Related U.S. Application Data

(63) Continuation-in-part of application No. 09/782,871, filed on Feb. 14, 2001
(60) Provisional application No. 60/182,331, filed on Feb. 14, 2000.

(51) Int. Cl.[7] .............................................. G08B 23/00
(52) U.S. Cl. .............................. 340/573.3; 340/573.1; 340/328; 340/330; 340/286.1; 340/655; 340/666; 340/539; 119/174
(58) Field of Search ........................ 340/573.3, 573.1, 340/328, 330, 286.11, 665, 666, 539; 119/174

(56) References Cited

U.S. PATENT DOCUMENTS

| | | | | |
|---|---|---|---|---|
| 4,686,504 A | * | 8/1987 | German | 340/328 |
| 5,303,677 A | * | 4/1994 | Jones | 119/174 |
| 5,475,369 A | * | 12/1995 | Baker | 340/573 |
| 5,604,478 A | * | 2/1997 | Grady et al. | 340/330 |
| 5,952,926 A | * | 9/1999 | Syverson | 340/573.3 |
| 6,094,139 A | * | 7/2000 | Moore | 340/573.1 |

* cited by examiner

*Primary Examiner*—Daniel J. Wu
*Assistant Examiner*—Tai T. Nguyen
(74) *Attorney, Agent, or Firm*—Donald C. Simpson

(57) ABSTRACT

A pet training device designed to alert a pet owner that his/her pet would like to enter or exit the home.

2 Claims, 9 Drawing Sheets

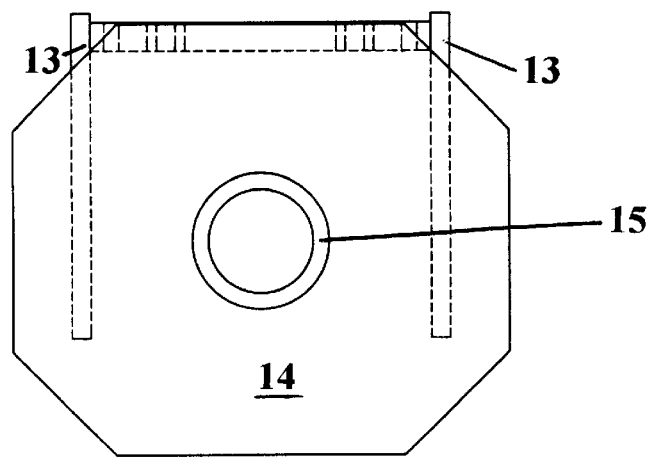
Fig. 6
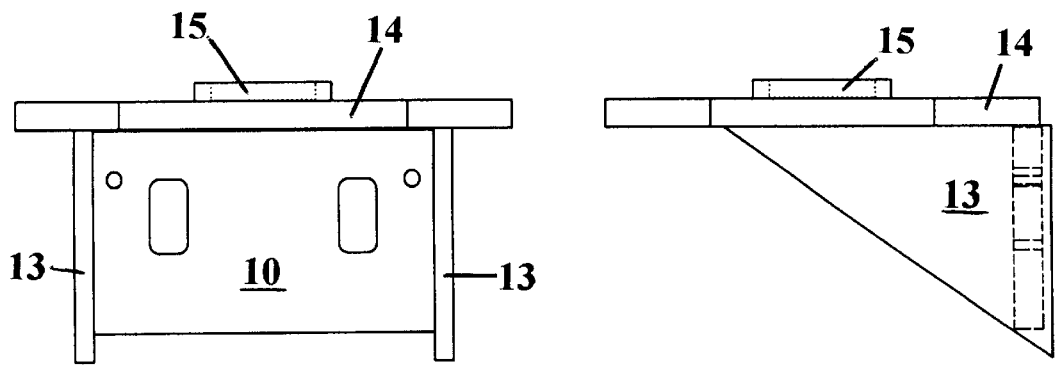
Fig. 7  Fig. 8

_US 6,445,302 B2_

PET WIRELESS DOORBELL DEVICE

CROSS REFERENCES TO RELATED PATENT APPLICATIONS

This patent application is a continuation-in-part of copending patent application Ser. No. 09/782,871 filed Feb. 14, 2001, which in turn claims the benefit of provisional patent application Serial No. 60/182,331 filed Feb. 14, 2000.

This invention relates to devices designed to alert a pet owner that his/her pet would like to enter or exit the home.

BACKGROUND OF THE INVENTION

There have been a great many patents issued for inventions designed to signal the pet owner when his/her pet wants to come inside or go outside their home, including older patents such as U.S. Pat. 1,118,283 to R. H. Holdefer and U.S. Pat. No. 2,655,122 to F. M. Adams Oct. 13, 1953 and more recent patents such as U.S. Pat. No. 5,475,369 to Baker, U.S. Pat. No. 5,604,478 to Grady, and U.S. Pat. No. 5,952,926 to Syverson.

These signaling devices can be used in conjunction with a training device. The pet owner uses the pet's favorite food or treat in a suitable receptacle associated with the signaling devices to train the pet to depress the signal button lever. The sound of the signal which the animal hears relates the opening of the door to the pets favorite treat. When this procedure is repeated in several training sessions, the pet will have been programmed into a "habit". The more times the pet successfully rings the bell promptly followed by the opening of the door, and the treat, the more the habit is enforced. Once the "habit" is created, the pet will associate the sound of the door chimes, the opening of the door and the dinner that it receives all as one unit. In other words, the sound, the door opening and the treat or dinner become inseparable within the mind of the pet. Later, it will not be necessary to give the pet a treat each time it comes inside.

Despite the obvious desire by pet owners for such a device, they have not achieved significant commercial success and it is difficult to find a place to purchase such devices. It appears that these past inventions inadequately address the needs of specific pets and specific pet owners but instead attempt to produce a single design product for all pets irrespective of size or character of the animal with the result that the devices tend to misfire and/or the pet is unable to consistently strike, push, scratch or whatever to produce the desired signal. In particular, the existing devices appear to be designed primarily for larger dogs but do not function equally effectively for cats and small or toy dogs. For example, the specific examples shown for the more recent prior art all describe a vertical activating surface in which the pet must reach upward and "swipe" at the surface with a paw or push on it with its nose. A cat's nose is surrounded by extremely sensitive whiskers which it uses to "sense" or feel the world around it. Most cats carefully avoid use of the nose and whiskers as anything other than sensory organs; seldom if ever will a cat be observed using the nose/whiskers part of its body as a pushing tool. Cats and small dogs have no hesitation, however, to step forward or push something at or below head level with a paw.

The Baker patent states in broad terms that the claimed device can be used in a horizontal position but provides no specifics for a horizontal adaptation. Attempts to utilize a device of the Baker type have shown that the Baker device is not readily adapted to the horizontal usage and is not suitable for most cats and small dogs.

SUMMARY OF THE INVENTION

The present invention has been specifically designed for indoor/outdoor cats and small dogs, such as the toy dog breed, and to be free of misfires when used by such pets. In essence, the present invention is an improvement in the Baker device so as to permit its ready use in the horizontal position. The complete device comprises a light, sturdy housing, a wireless signal transmitter, a treadle cover and a flex-plate which cooperate to activate the signal button of the wireless signal transmitter, one or more wireless receivers, and appropriate mounting means for the various parts. Rather than a vertical activating surface, the device is provided with a horizontal activating surface which can be readily operated through the use of an extended paw with the weight of the animal behind it to insure that misfires are avoided and the signal is transmitted effectively. The signal then activates the wireless signaling device such as a bell or chime which can be heard inside and outside the home simultaneously.

BRIEF DESCRIPTION OF THE DRAWINGS

FIGS. 6, 7, and 8 are, respectively, a top view, a front elevation view, and a side view of the assembled support structure for the present invention for the parts illustrated in FIGS. 3 through 5.

DETAILED DESCRIPTION OF THE INVENTION

Figure 1:
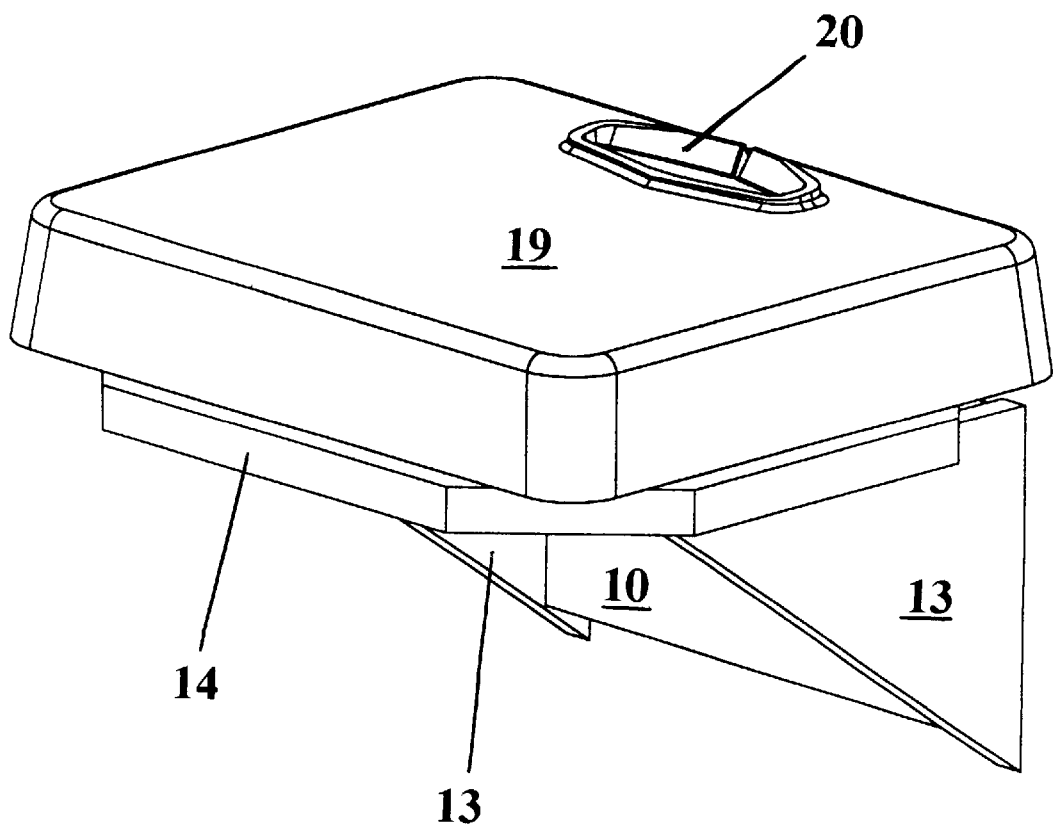
FIGS. 1 and 2 are perspective views of the present invention viewed from a position above and below, respectively.
Figure 2:
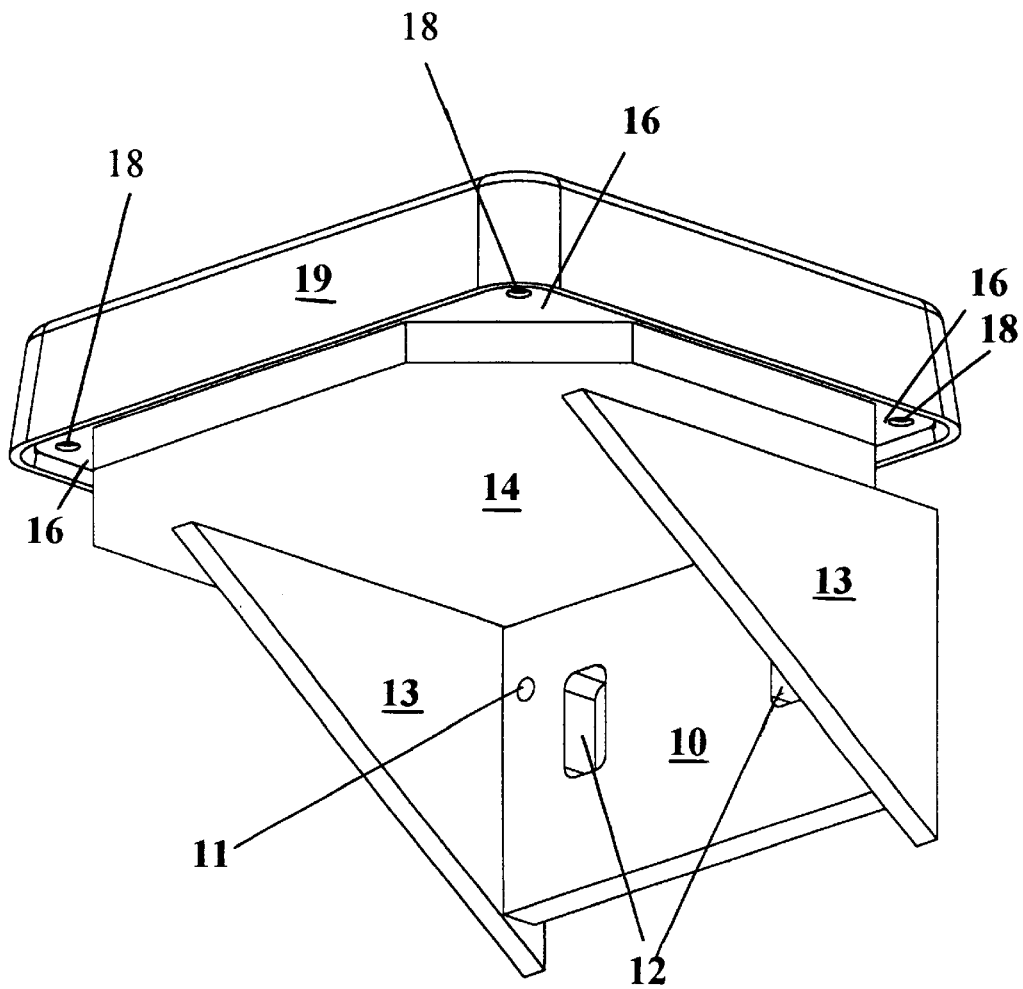
Figure 9:
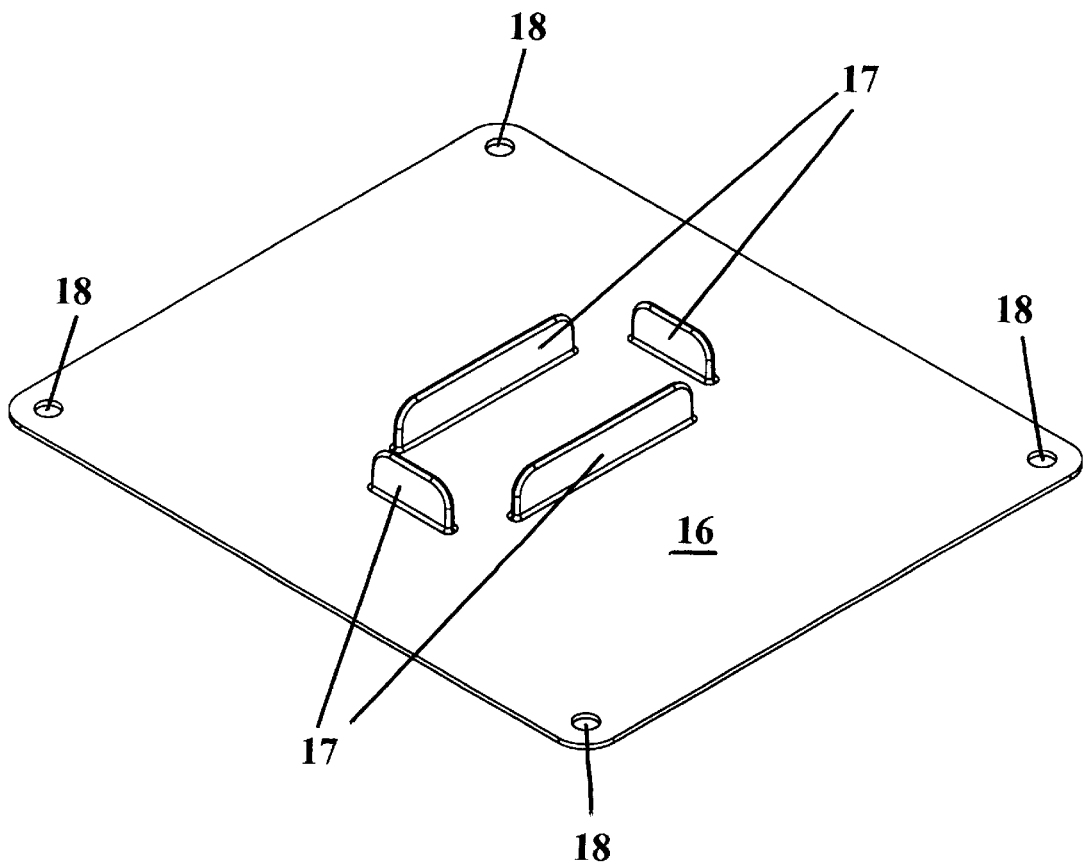
FIG. 9 is a perspective view of a preferred flex-plate.
Figure 10:
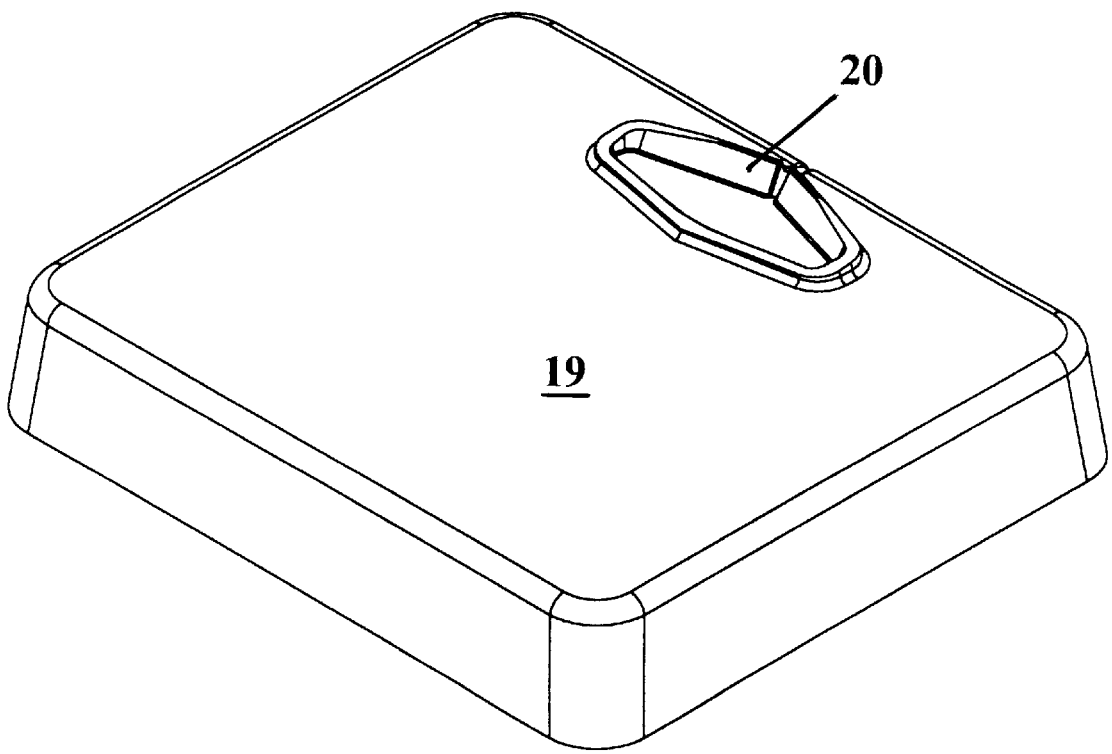
FIGS. 10 and 11 are perspective views showing, respectively, the top and the underside of a treadle-cover for the device of the present invention.
Figure 11:
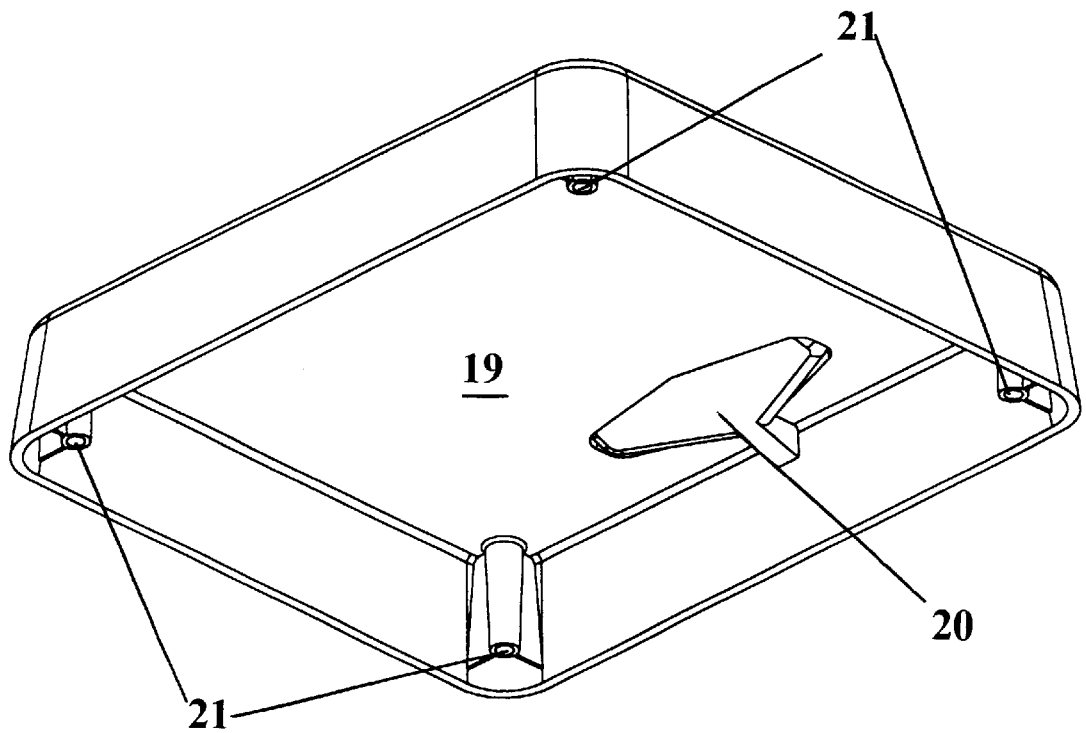

As illustrated in FIGS. 1 and 2, the device of the present invention comprises essentially three basic components, a support and mounting mechanism, as shown in FIGS. 3 through 8; a flex-plate, as shown in FIG. 9; and a treadle-cover, as shown in FIGS. 10 and 11. The system also, of course, requires at least one wireless transmitter-receiver, as show, for example, in Baker U.S. Pat. No. 5,475,369 and the co-pending patent application Ser. No. 09/782,871 of the present applicant.

Figure 3:
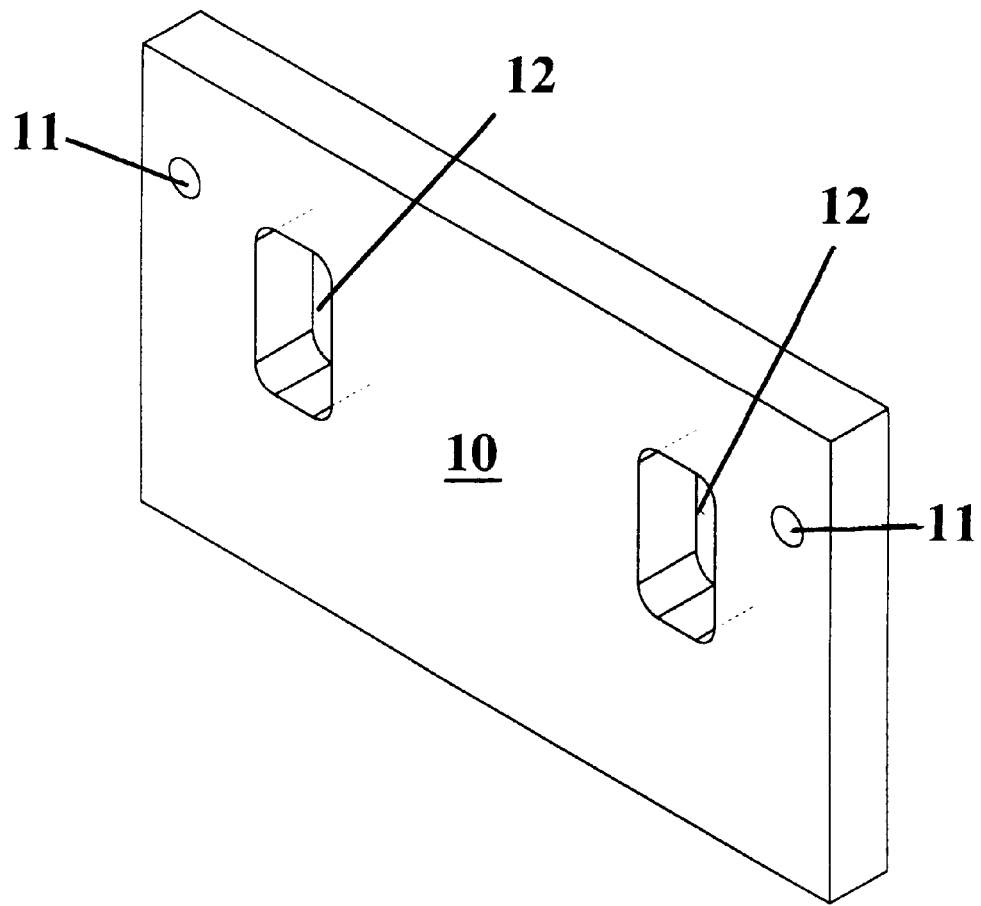
FIG. 3 is a perspective view of the vertical rear support of the present invention.
Figure 4:
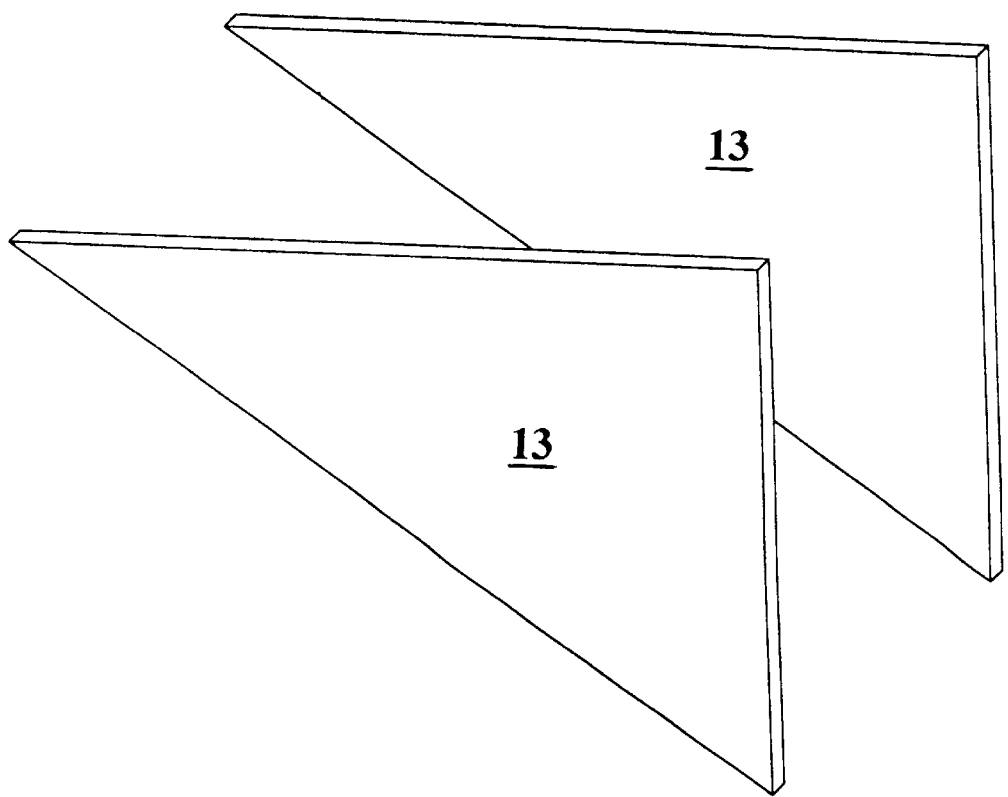
FIG. 4 is a perspective view of a pair of vertical side supports of the present invention.

With specific reference to FIGS. 3 through 8, the under supporting mounting means comprises vertical back 10, vertical sides 13, and horizontal support member 14. For convenience in mounting, the vertical back member 10 for the preferred embodiment includes holes 11 for mounting screws to be driven into a wall, if desired, or openings 12 to permit mounting on a pair of appropriately spaced hooks on the vertical wall of a residence or other building where the device is to be used. (FIG. 3.) The vertical back member is positioned between vertical side supporting members 13, and at right angles thereto, in a manner such that the top surfaces of the back member and the side members are essentially flush. In the preferred embodiment, as shown in the drawings, the back member 10 is inset a short distance from the rear edge of support members 13 to ensure that when the overall device is fully assembled and mounted on a vertical wall or surface, any moving parts above the supporting mechanism (e.g., 16 and 19) will have clearance from the wall and be able to move without rubbing against the vertical wall.

Figure 5:
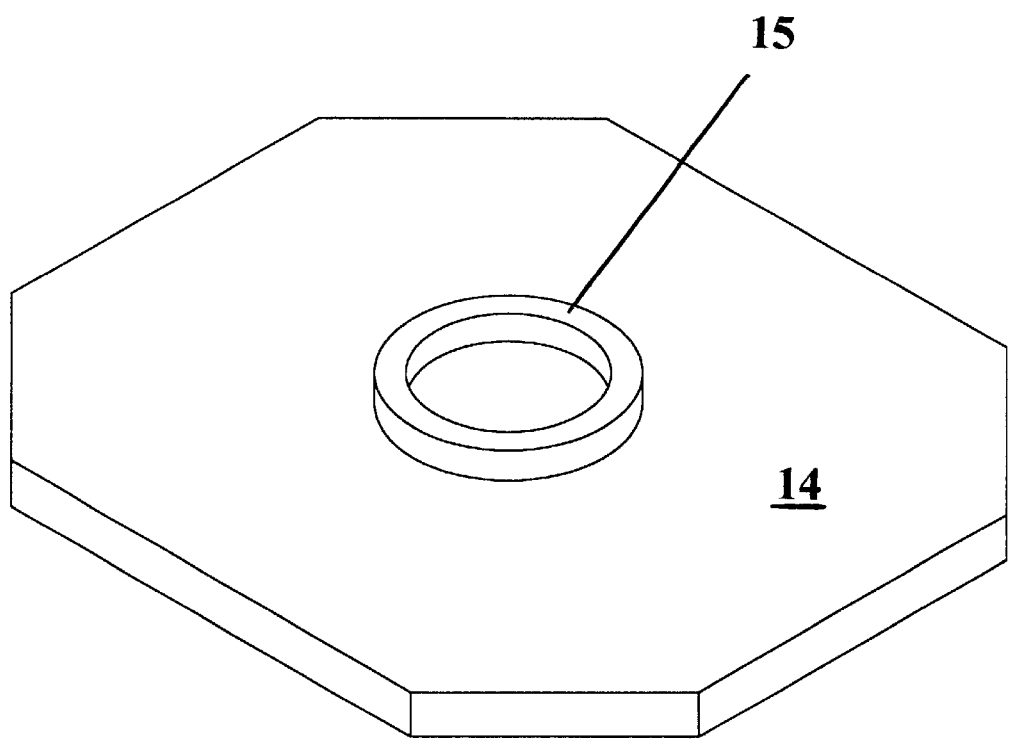
FIG. 5 is a perspective view of a horizontal support member with spacer affixed.

In FIG. 5, there is shown a preferred embodiment of horizontal supporting means 14, which is generally octagonal in shape. This horizontal support means is rigid and has generally centrally positioned thereof a spacer means 15. The shape and general design of the horizontal support means relates specifically to the shape and design of the flex plate of FIG. 9 and of the treadle-cover 19, and will be discussed subsequently herein.

The term "flex-plate" describes a resiliently flexible plate or sheet of material identified as 16 in FIG. 9. In general, the flex plate when constrained at the center is capable of flexing at the corners and/or edges when the corners or edges are subjected to a generally right-angle stress, and to return to its original position when the stress is removed. In the preferred embodiment shown in FIG. 9, flex-plate 16 is provided with mounting holes 18 and with optional mounting means 17 for holding a wireless transmitter as described in the prior art. These mounting means as shown can be eliminated and replaced with Velcro or other means for removably holding the transmitter in place. As will be discussed subsequently, in some circumstances it is possible to eliminate this mounting means altogether.

FIGS. 10 and 11 show a preferred embodiment of the treadle-cover mechanism 19 of the present invention. In the normal operation, this treadle-cover will be disposed horizontally, and the upper surface would be available to be "pawed" or stepped upon by a pet. As shown in FIG. 11, threaded fastener receivers 21 are provided so that flex-plate 16 can be fastened to the underside of the treadle-cover 19 by, for example, threaded fasteners being inserted through the underside of holes 18 in flex-plate 16 and fastened into threaded fastening receiver means 21. Typically, threaded screws having a head large enough not to pass through 18 but a shaft small enough to pass through 18 are then screwed into threaded receivers 21 to tighten the flex-plate 16 to the underside of treadle-cover 19.

Before flex-plate 16 is fastened to treadle-cover 19, it is firmly affixed to the upper surface of spacer 15, which in turn is affixed to horizontal supporting means 14. Horizontal supporting means 14 is shown shaped as an octagon so as to permit clearance of any screws and screwdrivers needed in order to attach or separate flex-plate 16 and treadle-cover 19. It should be clear, however, that horizontal supporting means 14 could be essentially the same general configuration as the flex-plate, but with holes large enough to permit the insertion of screws and the operation of a screwdriver for the fastening of screws through flex-plate 16 into the threaded receivers 21 of treadle-cover 19 or, in fact, the "corners" could be made arcuate sufficiently to provide clearance for the screws and/or screwdriver as needed.

Horizontal support means 14 serves a dual purpose. It is also a function of this horizontal support means to limit the degree of flexing of flex-plate 16. When an animal steps on the surface of treadle-cover 19, a part of the treadle-cover nearest the part of stepping flexes downward until an undersurface of treadle-cover 19 presses on the actuating button of the signal transmitter sufficiently to send a signal to the receiver. For maximum sensitivity, the resiliently flexible flex-plate should not require too great a stress in order to flex sufficiently. Once an animal is trained, the system should respond even to the weight of a single animal paw being put on the surface of the treadle-cover. If, on the other hand, the pet places a great deal of weight on the treadle cover, then the sensitive flex-plate will flex unduly and in a relatively short time will simply break. Accordingly, while horizontal support member 14 must permit clearance for screws or screwdrivers, it also must be large enough that when the flex-plate is subjected to a stress, the horizontal support member acts as a stop or limiter for the extent of flexing to avoid excessive flexing. Thus, sensitivity without danger of breakage under excessive loads (e.g., a heavy dog jumping on the treadle-cover) is provided.

In the preferred embodiment as shown in the drawings, the signal transmitter was presumed to be mounted on the upper surface of flex plate 16. It would, however, be equally possible to invert the transmitter and mount it to the underside of treadle-cover 19 so that upon the flexing of flex-plate 16, the actuating button for the transmitter is actually lowered against the upper surface of flex plate 16 until the actuating button is sufficiently depressed. The mounting of the wireless transmitter to the underside of treadle-cover 19 is not as readily adaptable as in the preferred embodiment.

As shown in FIG. 10, treadle-cover 19 is provided with a "treat dish" 20. In normal usage, the treadle-cover is positioned with such dish positioned at the rear of the device relative to the wall on which the device is mounted. There are, in fact, other methods for providing treats which can be substituted There are certain features of the present invention that serve to distinguish it from the Baker device and make it particularly adaptable for use in a horizontal position for cats and small dogs. Of particular significance is the location of the signal-triggering device, i.e., the bell button relative to the transmitter-activating component shown as "Lid 1" in Baker. Because Baker designed his device to be operated in a vertical position, the transmitter was located in a compartment close to the pivot point of his Lid 1. This left excessive space between the Lid and the actuating button of the transmitter requiring that Baker add a "dimple" 12 as part of Lid 1 to ensure that appropriate contact would be made to actuate the transmitter upon pressure being applied to Lid 1. In the device of the present invention, the transmitter with its actuating button is positioned toward the center of the actuating treadle-cover 19, and there is no independent pivot point.

The treadle-cover is made from a material light enough to rest on the transmitter button without compressing the internal button spring of the transmitter sufficiently to activate the transmitter. When a force is applied to the edge or corner of the treadle-cover, the flex-plate 16 flexes and activates the transmitter and when the force is removed, the flex-plate returns to its original position and the internal spring of the transmitter will return the transmitter button to its unactuated position.

Another aspect of the present invention of considerable importance and which distinguishes it from Baker can be seen by examination of the back end of Baker's Lid 1. Because Baker designed his device to be used principally in the vertical position, it was necessary to provide the lid with a "Wall 18" to protect the inner workings against the elements. This wall was provided as a specific element of movable Lid 1 and moved with the lid as the lid was actuated. As a result, the Baker device can be operated in a horizontal position only by resting it on a surface which puts it at far too low a level for effective operation and makes no allowances for the different sizes of pets. A low positioning of the device can easily lead to accidental actuation in the normal course of a pet moving around in that area. By positioning the device at a higher level where the pet can be trained to reach up deliberately to actuate it, this problem of accidental actuation can be avoided. In Baker, this is possible only by placing the Baker device on bricks or other platforms, or on legs, and all of these alternatives are difficult to anchor against sliding or other types of movement. In the present invention, the device is provided with a firm back for mounting to a vertical surface, such as a wall or door that is immovable relative to the treadle-cover 19. The pet owner can adjust the height of mounting at will, according to the needs of the particular pet.

For the most effective and successful use of the pet doorbell training device, two identical wireless receivers are used, one near the unit for the pet to hear and the other inside the home at a location for ease of hearing by the pet owner. The outside unit may be placed above the door or where it is protected from direct contact with rain or snow or inside in close proximity to the base unit.

This device, as compared to most prior art devices, requires no pets scratching on doors or sitting on a mat, no alluring scent, no mercury switches, no holes or defacing the front door, no springs, washers, hinges, electrical wires or counter balancing parts, and no metal parts at all that would eventually rust or need replacement or repair. The device of the present invention can be made from light sturdy plastic material. It can be mounted adjacent to the door usually used by the pet by using Velcro, self adhesive plastic hooks, etc. and the height of the device may be adjusted as needed. The wireless transmitter has a range of about 100 feet, so the pet owner can place the wireless receiver just about anywhere in the average size home.

When the device is completely assembled, the housing is essentially one piece. In making the working embodiment, the flex-plate was manufactured from CYCOLAC Resin HXW-1000F, an ABS terpolymer of the plastics division of General Electric Company (detailed information is available, inter alia, in GE Material Safety Data Sheet of Mar. 9, 1999). The treadle-cover was manufactured from an epoxy resin/acrylate ester blend manufactured and sold by Ciba Specialty Chemicals Corporation under the name CIBATOOL SL 5170 (detailed information is available, inter alia, in Ciba Material Data Sheet of Apr. 8, 1998). The mounting support was manufactured from rigid, clear plastic, e.g., Plexiglas.

The wireless transmitter and the wireless receivers are manufactured products which can be purchased from one of many companies that make and sell them. The transmitter has it's own housing and is made of plastic and it has a small 12-volt alkaline battery inside. Batteries typically last about a year. The housing is weatherproof for outdoor use which is essential since the wireless transmitter will be housed within this invention and used outdoors. Also, these wireless transmitters can be purchased with a round bell button nipple or the extended bell button nipple. The spring inside the wireless transmitter will return the button to the normal position when the pet is not pressing on the treadle-cover.

With the present invention, a pet can have access to and depress the treadle-cover from the front, the right and or the left. All of the sides of the treadle-cover are free floating.

The embodiment of FIGS. 10 and 11 has a concave training receptacle 20 near the back support that is molded into the treadle-cover. This receptacle can be omitted and a removable receptacle used during the initial training period.

The unit should be mounted high enough so the pet cannot see if there is food in the training receptacle without stepping up on the treadle-cover. The weight of the animal's front torso combined with the impact of downward striking motion on the treadle-cover triggers the contacts inside the wireless transmitter sending a signal to the wireless receivers. It is necessary for the pet to hear the signal and also the pet owner. Ideally, there are two or more receivers, one inside and one outside. The outside receiver, although weather proof or weather resistant, should be protected from direct contact with rain or snow.

There are four basic mounting options:

(a) the device can be permanently mounted in place with screws;

(b) double faced tape can be used to adhere to the rear of the back support;

(c) Velcro may be used, which gives the option to remove the device periodically to clean or adjust the height from time to time; or (d) back hooks. The back underside of the back support is designed for this purpose. This method of mounting is of particular use inside the home since the pet owner may remove the unit easily at those times when the owner doesn't want the pet to go out.

In any of these mounting methods, the side supports, as part of the housing, naturally press against the wall and will take all the weight and pressure off the upper housing when a pet presses on the treadlecover.

What is claimed is:

1. In an animal-actuated signaling unit comprising a wireless transmitter, a companion wireless receiver, a transmitter actuating means, and a supporting means, the improvement which comprises a transmitter actuating means comprising a generally horizontally disposed treadle-cover, a flex plate, means for removably attaching said flex plate to said treadle-cover to define a space between them sufficient to contain said wireless transmitter, the inner surface of one of said treadle cover and said flex plate adapted to retain a wireless transmitter in a position facing the other of said inner surfaces, said supporting means adapted to attach to a vertical surface and to support said transmitter actuating means in a generally horizontal position, said support means and said transmitter actuating means having a spacing means interposed there between to limit the extent of flexing of said flex plate when a load is applied to said treadle-cover to avoid breakage of the flex plate.

2. An improved device in accordance with claim 1 in which said treadle-cover has affixed thereto a treat receptacle on the outer surface thereof.

* * * * *